United States Patent
Hoch et al.

(10) Patent No.: US 10,113,881 B2
(45) Date of Patent: Oct. 30, 2018

(54) METHOD AND DEVICE FOR PROVIDING AN ELECTRONIC APPOINTMENT SCHEDULER FOR A VEHICLE

(71) Applicant: Volkswagen Aktiengesellschaft, Wolfsburg (DE)

(72) Inventors: Nicklas Hoch, Hannover (DE); Bernd Werther, Braunschweig (DE); Michael Mischke, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/298,078

(22) Filed: Jun. 6, 2014

(65) Prior Publication Data

US 2014/0288832 A1 Sep. 25, 2014

Related U.S. Application Data

(63) Continuation of application No. PCT/EP2012/073911, filed on Nov. 29, 2012.

(30) Foreign Application Priority Data

Dec. 6, 2011 (DE) .......... 10 2011 120 159
Jun. 12, 2012 (DE) .......... 10 2012 011 605

(51) Int. Cl.
*B60G 17/016* (2006.01)
*B60G 23/00* (2006.01)
(Continued)

(52) U.S. Cl.
CPC ............ *G01C 21/3697* (2013.01); *B60L 3/12* (2013.01); *B60L 11/1861* (2013.01);
(Continued)

(58) Field of Classification Search
CPC ...... B60L 3/12; B60L 11/1861; G01C 21/343; G01C 21/3469; G01C 21/3697; G06Q 10/109
(Continued)

(56) References Cited

U.S. PATENT DOCUMENTS 5,790,976 A 8/1998 Boll et al.
5,892,346 A 4/1999 Moroto et al.
(Continued)

FOREIGN PATENT DOCUMENTS

DE 195 19 107 C1 4/1996
DE 100 59 746 A1 10/2001
(Continued)

*Primary Examiner* — Maceeh Anwari
(74) *Attorney, Agent, or Firm* — Muncy, Geissler, Olds & Lowe, P.C.

(57) ABSTRACT

A method and a device for providing an electronic appointment scheduler for a vehicle. Appointments are acquired that have associated time data and geographical positions; the residual amount of energy available for driving the vehicle is acquired and data relating to a geographical road network, including the geographical positions of energy-supply devices suitable for said vehicle, are acquired. Taking into account the time data and geographical positions associated with the appointments, the available residual energy amount, and the energy consumption of the vehicle on a potential travel route, a route plan and an energy fill-up plan are produced, with supplemental periods of time being calculated that are associated with the appointments and derived on the basis of the route plan and energy fill-up plan. An appointment schedule is then produced and issued which comprises these appointments as well as the supplemental time periods that are associated with these appointments.

13 Claims, 5 Drawing Sheets

(51) Int. Cl.
- *B62C 3/00* (2006.01)
- *B62K 25/00* (2006.01)
- *G06F 7/00* (2006.01)
- *G06F 17/00* (2006.01)
- *G06F 19/00* (2018.01)
- *G01C 21/36* (2006.01)
- *G01C 21/34* (2006.01)
- *G06Q 10/10* (2012.01)
- *B60L 3/12* (2006.01)
- *B60L 11/18* (2006.01)

(52) U.S. Cl.
CPC ....... *G01C 21/343* (2013.01); *G01C 21/3469* (2013.01); *G06Q 10/109* (2013.01); *B60L 2240/12* (2013.01); *B60L 2240/622* (2013.01); *B60L 2240/642* (2013.01); *B60L 2240/645* (2013.01); *B60L 2240/647* (2013.01); *B60L 2240/80* (2013.01); *B60L 2250/10* (2013.01); *Y02T 10/705* (2013.01); *Y02T 10/7005* (2013.01); *Y02T 10/7044* (2013.01); *Y02T 10/7291* (2013.01); *Y02T 90/16* (2013.01); *Y02T 90/161* (2013.01); *Y02T 90/162* (2013.01)

(58) Field of Classification Search
USPC .................................................. 701/400, 538
See application file for complete search history.

(56) References Cited

U.S. PATENT DOCUMENTS

| | | | |
|---|---|---|---|
| 6,119,095 A | 9/2000 | Morita | |
| 7,992,096 B1* | 8/2011 | Davis | H04M 1/274525 |
| | | | 715/781 |
| 8,054,038 B2 | 11/2011 | Kelty et al. | |
| 8,698,642 B2 | 4/2014 | Taguchi | |
| 8,713,108 B2* | 4/2014 | Naito | G01C 21/005 |
| | | | 709/206 |
| 2002/0019835 A1 | 2/2002 | Baur et al. | |
| 2008/0243331 A1 | 10/2008 | Kato | |
| 2011/0202221 A1* | 8/2011 | Sobue | B60K 16/00 |
| | | | 701/22 |
| 2014/0288832 A1 | 9/2014 | Hoch et al. | |

FOREIGN PATENT DOCUMENTS

| | | |
|---|---|---|
| DE | 100 28 660 A1 | 12/2001 |
| DE | 10 2006 050 096 A1 | 11/2007 |
| DE | 10 2008 030 563 A1 | 12/2009 |
| DE | 10 2010 039 075 A1 | 2/2011 |
| DE | 10 2010 014 291 A1 | 10/2011 |
| DE | 10 2012 011 605 A1 | 6/2013 |
| EP | 1 909 069 A1 | 4/2008 |
| EP | 1 975 562 A2 | 10/2008 |
| WO | WO 2013/083465 A1 | 6/2013 |

* cited by examiner

METHOD AND DEVICE FOR PROVIDING AN ELECTRONIC APPOINTMENT SCHEDULER FOR A VEHICLE

This nonprovisional application is a continuation of International Application No. PCT/EP2012/073911, which was filed on Nov. 29, 2012, and which claims priority to German Patent Application No. 10 2011 120 159.2, which was filed in Germany on Dec. 6, 2011 and German Patent Application No. 10 2012 011 605.5, which was filed in Germany on Jun. 12, 2012, and which are all herein incorporated by reference.

BACKGROUND OF THE INVENTION

Field of the Invention

The present invention relates to a method for providing an electronic appointment scheduler for a vehicle based on detected limiting conditions. These limiting conditions comprise appointments with associated time data and geographical positions. They comprise further the residual energy amount available for powering the vehicle and data on a geographical road network, including geographical positions of energy supply facilities suitable for the vehicle. The present invention relates further to an associated device.

Description of the Background Art

The user of a vehicle often encounters the problem that they must keep different appointments at different locations within a specific time period. The appointments and the route planning to keep the appointments must be coordinated, so that the user will reach the locations where the appointments are to occur in a timely fashion with the vehicle. It must be considered in this regard that the power storage device of the vehicle must be replenished from time to time. The reachability of suitable energy supply facilities and the time for replenishing the energy must be considered in the route planning and the time planning.

DE 10 2008 030 563 A1 describes, for example, a motor vehicle with a device for determining the remaining range and a navigation system by which the driver of the vehicle can be informed about destinations that he can reach with the energy content of the energy storage device of the vehicle and from which he can return to the starting point without replenishing the energy storage device.

There is a desire particularly in the case of electrically powered vehicles to include the best possible recharging of the battery in the travel route planning. On the one hand, the range of an electric vehicle is typically much smaller than the range of a vehicle powered by fuel; on the other hand, charging stations suitable for charging the vehicle battery presently are still located much farther apart than gasoline stations and the battery charging process takes longer than refilling the vehicle's tank with fuel.

DE 10 2010 039 075 A1, which corresponds to U.S. Pat. No. 8,698,642, describes an energy management system for an electric vehicle in which the required energy amount is compared with the remaining energy amount for a navigation route to a departure point and a destination point. If the remaining amount of power is not sufficient, information on the insufficiency is output. Further, charging stations for the navigation route that allow reservations to be made can be searched and displayed.

DE 195 19 107 C1, which corresponds to U.S. Pat. No. 5,790,976, describes a travel route guidance device, particularly for electric vehicles. For this purpose, a travel route is determined and displayed in the vehicle that includes intermediate stops possibly necessary enroute for energy resupply.

U.S. Pat. No. 8,054,038 B2 describes a method and apparatus for optimizing the charge state of a battery of an electric vehicle. The battery charging conditions at the particular destinations are determined and displayed for a predetermined route plan with a destination or a number of destinations and optionally other limiting conditions such as, e.g., road and weather conditions and setting of a charging state safety margin. The route plan can be input in the vehicle via a touchscreen.

SUMMARY OF THE INVENTION

It is therefore an object of the present invention to provide a method and a device for providing an electronic appointment scheduler for a vehicle of the aforementioned type, which provides the user with a rapid and intuitively understandable overview of implicit relationships of an appointment sequence and also permits a change in the appointment schedule in a simple manner.

In an embodiment of the method of the invention for providing an electronic appointment scheduler for a vehicle, appointments with associated time data and geographical positions are acquired; the residual energy amount available for powering the vehicle is acquired, and data on a geographical road network, including geographical positions of energy supply facilities suitable for the vehicle, are acquired. A route plan and an energy replenishment plan are generated with consideration of the time data and geographical positions, associated with the appointments, and with consideration of the available residual energy amount and the energy consumption by the vehicle on a potential travel route, whereby supplemental time periods associated with the appointments are calculated that are derived based on the route plan and the energy replenishment plan. An appointment schedule with the appointments and the supplemental time periods associated with the appointments is then generated and output, e.g., displayed on a display area. The displaying of these supplemental time periods necessary to enable the appointment schedule support the user of the appointment schedule, normally the vehicle driver himself, in better understanding the requirements of the appointment schedule. The supplemental time periods can be visualized in such a way that the relationships between the appointments, on the one hand, and the necessary route plan and the energy replenishment plan, on the other, become intuitively understandable to the user.

The acquisition of the appointments can occur in a manner known per se. For example, the appointments are input directly in the vehicle. Alternatively or also in addition, the appointments are received by synchronization with an external appointment calendar, for example, the electronically stored appointment calendar in a small portable computer of the vehicle's driver, or via a wireless connection from a device located outside the vehicle. For example, a text message or e-mail with a meeting request is received from a third party.

The acquisition of the geographical road network also occurs in a manner known per se. In particular, a digital road map is read out of a database in a navigation device disposed in the vehicle. Alternatively or also in addition, information can be acquired via other road users or stationary facilities. In particular, current information on individual energy supply facilities, e.g., as to their availability, can be acquired and optionally reservation requests can be sent.

Other parameters can be acquired as well as limiting conditions for generating the appointment schedule. Depending on the embodiment, for example, configurable user profiles are provided in which safety margins in the time schedule or in the charge state can be set. Depending on user preference, with consideration of the supplemental times, e.g., time margins between two appointments are set, which the user reserves for unforeseen events and general requirements such as break times. A safety margin in the charge state can be preconfigured, for example, manually in order to take into account a decline in performance in cold weather and/or when other consumers are turned on before the start of a trip, e.g., an auxiliary heating system.

In principle, the method of the invention can be used for any type of vehicle. The use is directed in particular for vehicle types where the replenishment of energy reserves must be considered in advance because of an energy supply network that is insufficiently dense and extensive and/or the energy replenishment requires a significant proportion of time per se. An especially advantageous use results, when the vehicle is electrically powered and the suitable energy supply facilities comprise electrical charging points. The ranges of electrically powered vehicles, provided they do not have an additional internal combustion engine, are currently still relatively limited and the charging process takes up significantly more time than filling a tank with a liquid or gaseous fuel.

Because at the present time charging points are rare, the occupancy of a charging point is subject to greater time variations than gasoline stations. This may result in unforeseen waiting times at a charging point. Furthermore, such charging points are still not very standardized, so that the charging time itself depends on the charging output of the particular charging station. Therefore, it is advantageously provided that the properties of the charging points, particularly their time availability and charging output, are acquired and considered in the generation of the appointment schedule. If mobile charging points become established, for example, in the form of electricity consumers as an infrastructure facility along heavily traveled roads such as highways, the usability of such a facility and the implication for driving behavior, e.g., speed restriction, must possibly be considered.

The supplementary time periods in the appointment schedule typically fall between two appointments. They comprise in particular travel times between two appointments at different geographical position, walking times between a charging station and a geographical position associated with an appointment, waiting times at an energy supply facility, particularly at a charging station, and/or energy replenishment times, particularly charging times, at an energy supply facility. The supplementary time periods can also overlap at least partially with other supplemental time periods or one of the adjacent appointments. Thus, the driver of an electric vehicle must first park the vehicle at the charging station and connect it to charge the battery, but the charging process, presuming the availability of the charging station, can then occur concurrently with the subsequent walk to and the duration of the appointment.

Depending on the embodiment of the method of the invention, the route plan and/or the energy replenishment plan are generated depending on the various limiting conditions. These limiting conditions comprise in particular the topography of the geographical road network, traffic, time of day, day of the week, time of year, weather conditions, route-specific energy consumption, cost, availability of the energy supply facility, and/or the residual energy amount in the vehicle. These limiting conditions may possibly influence each other. Thus, the route-specific energy consumption depends on the traffic, whereby the traffic may already be considered in the selection of the route, i.e., in the generation of the route plan. The ending time of an appointment and the starting time of a following appointment influence in particular the question whether a slower, energy- and cost-saving route or the fastest route is more advantageous for the overall planning of the appointment schedule. The route selection therefore also influences the residual energy amount, available in the vehicle, after a traveled route section. Expediently, first the unalterable limiting conditions, e.g., the initially available residual energy amount, the considered time period, and the weather forecast, as well as the user-determined appointment specifications, are therefore taken into account and possible alternatives to the route plan and energy replenishment plan are simulated on this basis. From the possible results based on an evaluation model and proposed to the user, a specific appointment schedule can then be selected.

In this regard, an appointment schedule is set up without overlapping time data for the different appointments and the supplemental time periods in order to preclude appointment clashes.

The generated appointment schedule with the appointments and the associated supplemental time periods can be displayed in the vehicle for the user or the driver of the vehicle to see immediately. Free time periods between the amount of appointments and the supplemental time periods are visualized for the user as appointment-schedule degrees of freedom, so that he rapidly recognizes choices and latitudes for action.

The appointments of the appointment schedule as such are changeable. Their time data can be shifted or the appointment as a whole can be deleted. The change of the appointment schedule occurs, for example, from outside, in that a new or updated meeting request is sent via a wireless interface to the appointment scheduler. In this case, the situation is reevaluated and, if necessary, a new appointment schedule is produced immediately. Depending on the embodiment, such meeting requests are not incorporated immediately into the appointment schedule, but must first be acknowledged by the user and then be explicitly inserted in the appointment schedule by the provided operating actions.

Furthermore, the user himself on his own initiative can add new appointments to the appointment schedule. To this end, the display of free time periods between already existing appointments and supplemental time periods is helpful to him.

In an embodiment, it is provided that the appointment scheduler can be switched at least between two operating modes by means of an operating action, whereby in a first operating mode the appointments and the supplementary time periods, caused by the route plan and/or energy replenishment plan, are shown and the time data associated with an appointment and/or a supplementary time period are shifted in time by an operating action, and whereby in a second operating mode the supplementary time periods are faded out and the appointment sequence is changed by an operating action. The second operating mode corresponds to a simple presentation, known per se, of an appointment calendar. This is the preferred display form, if only a fixed appointments sequence must be observed. This type of display form may also be sufficient to change the appointment sequence, e.g., to swap two appointments, without visually overtaxing the user with too much detail or increasing the complexity of operation. The first operating mode in contrast allows insight into the detailed planning with the necessary limit information and relationships between the appointments and the particular supplemental time periods. Here, the user in particular can also manually change the charging times. This expands his freedom of action.

The operating actions are carried out in the vehicle in a manner known per se. In an advantageous embodiment, they are performed by operating actions on the touch-sensitive surface of a touchscreen or a touchpad. The operating actions can be executed alternatively or in addition by means of contactless gestures in front of the display of the appointment schedule.

If the appointment sequence, the time data associated with an appointment, and/or a supplementary time period resulting from the energy replenishment plan are changed by an operating action, then the effects on other parts of the appointment schedule, i.e., the not explicitly changed appointments, route plan, and energy replenishment plan, are analyzed. If necessary, the route plan, energy replenishment plan, and/or the appointment schedule are then newly generated. The display of the newly generated appointment schedule is then updated preferably automatically.

It is advantageously provided that, if in consideration of all limiting conditions the appointment schedule is based on, a time conflict between appointments and supplementary times is detected, a warning message is output. This warning message alerts the user quickly to the time conflict. Optionally, a list of suggestions for eliminating the time conflict is displayed in addition. The suggestion is made, e.g., that one of the appointments is to be postponed. A time conflict can perhaps also be resolved other than by appointment postponement. If, for example, a relatively large safety buffer was preset in the time planning and/or in the requirement for the minimum charge state of the battery, a time conflict may also be resolved by possibly reducing this type of safety buffer. For example, the vehicle battery charging process is stopped somewhat earlier if it is detected that the assumed most unfavorable condition with a negative effect on battery performance or the expected energy consumption, e.g., very low temperatures or high traffic volume, has not occurred.

The device of the invention for providing an electronic appointment scheduler for a vehicle comprises a first interface to a data memory, in which data on a geographical road network, including geographical positions of energy supply facilities suitable for the vehicle, are stored, a second interface over which appointments with the associated time data and geographical positions can be acquired, and a third interface over which the residual energy amount available for powering the vehicle can be acquired. The device of the invention comprises further a computing unit which is coupled to the interfaces and by means of which a route plan and energy replenishment plan can be generated with consideration of the time data and geographical positions of the appointments and with consideration of the available residual energy amount and the energy consumption by the vehicle on a potential travel route, whereby appointment-associated supplemental time periods can be calculated, which arise due to the route plan and the energy replenishment plan. The device comprises further an output unit coupled to the computing unit, preferably an operable display surface, by means of which an appointment schedule, generated by the computing unit, with the appointments and the appointment-associated supplementary time periods can be output.

The device of the invention is particularly suitable for carrying out the method of the invention. It therefore also has the advantages of the method of the invention.

The device of the invention is particularly a device fixedly or detachably connected to a vehicle, preferably with an interface for synchronizing the appointment scheduler with a master appointment scheduler and/or for receiving external appointment requests.

According to an embodiment of the invention, a vehicle is coupled to such a device, whereby the residual energy amount of the relevant vehicle can be acquired via the third interface. The vehicle preferably comprises an electric drive. It is, for example, an electric vehicle or a so-called hybrid vehicle with an electric drive and a fuel-powered drive.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
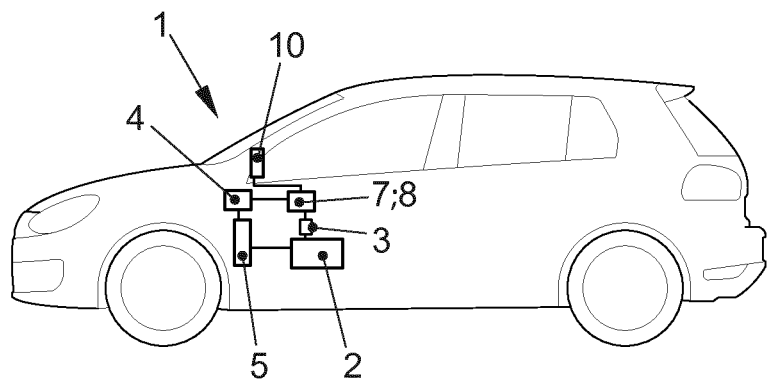
FIG. 1 shows an electric vehicle, in which the device for providing an appointment scheduler according to an exemplary embodiment of the invention is disposed.

An electrically powered vehicle 1, which is equipped with a device for providing an electronic appointment scheduler according to an exemplary embodiment of the invention, is shown in FIG. 1. The electrically powered vehicle 1, as known per se, is equipped with an electric motor 5, connected to battery 2, for powering vehicle 1 and with a motor control 4, connected to electric motor 5.

The residual amount of charge available for powering vehicle 1 can be measured by means of a charge meter status 3 connected to battery 2.

Figure 2:
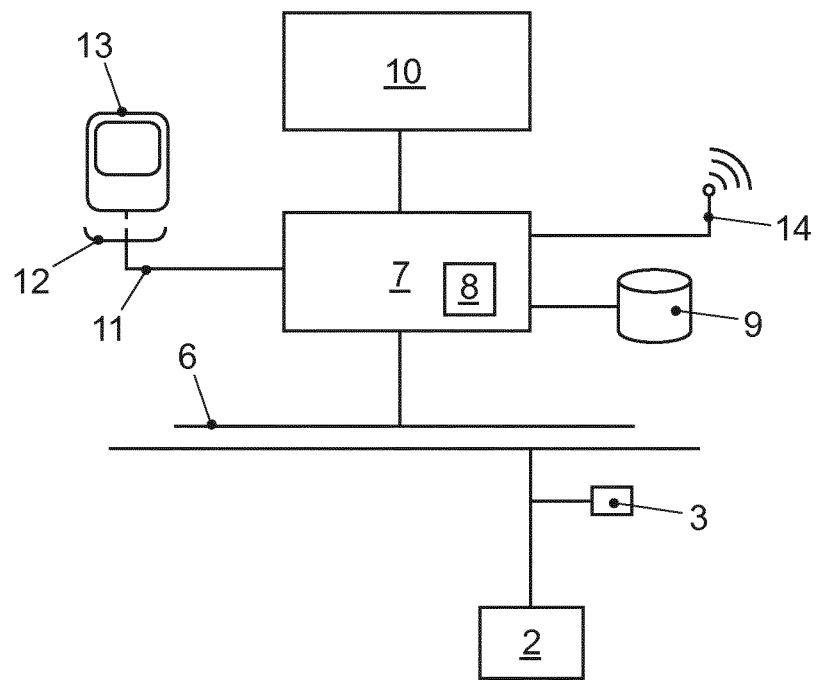
FIG. 2 shows schematically the structure of the device of the invention from FIG. 1.

The device of the invention disposed in vehicle 1 and its connection to the vehicle data infrastructure are shown schematically in FIG. 2 with a greater level of detail. The device of the invention according to this exemplary embodiment is integrated in a navigation device or driver assistance system permanently installed in vehicle 1. It comprises a control unit 7 for generating and sending control commands and communication data to peripherally connected units. A computing unit 8, by means of which an appointment schedule can be calculated, is integrated in control unit 7, as will be described in still greater detail in connection with the method of the invention. The device of the invention comprises further touchscreen 10 which is controllable by control unit 7 and on which output contents, particularly calculated appointment schedules, can be displayed. Operating actions by the user are detected on the touch-sensitive surface of touchscreen 10 and passed on to control unit 7.

The device of the invention further accesses by means of control unit 7 a data memory 9, in which data on a digital road map are stored. A route plan can be calculated in a manner known per se for vehicle 1 based on the current location and the digital road map by means of a positioning unit, e.g., a GPS module (GPS=Global Positioning System, not shown). The digital road map to this end comprises digitally stored information of the geographical positions of streets, cities, and points of interest (POI). The POI comprise in particular charging stations for charging battery 2 of vehicle 1.

Control unit 7 is connected via data bus 6 in vehicle 1 to charge meter status 3 and can detect the residual amount of charge in battery 2

Control unit 7 further can create a data connection via wireless interface 14, via which relevant information for calculating a route plan and a charge plan for battery 2 can be received, as will be explained in still greater detail in connection with the method of the invention. For example, traffic reports, a weather forecast, and availability information on charging stations for charging battery 2 can be received.

Control unit 7 can be connected via a data interface 11 to an external data device with an appointment calendar function and optionally synchronized. Data interface 11 is provided via a cradle 12 for placing the external data device, e.g., a mobile telephone 13 known per se or a PDA (Personal Digital Assistant). Mobile telephone 13 operates particularly according to a common mobile wireless standard, e.g., GSM (Global System for Mobile Communication) or UMTS (Universal Mobile Telecommunication System). A data connection between mobile telephone 13 and control unit 7 can be created by placing mobile telephone 13 in cradle 12, so that the time data associated with the individual appointments and the geographical positions can be transmitted to computing unit 8 and there processed further. Alternatively or also in addition, control unit 7 for this purpose can also create a data connection (not shown) with mobile telephone 13 via a near field wireless interface such as, e.g., an infrared interface or Bluetooth. Mobile telephone 13 can thereby receive other appointment requests from other mobile wireless subscribers (not shown), which may be considered in the creation of the appointment schedule, e.g., as appointment requests.

The method of the invention will now be explained in greater detail by an exemplary embodiment and with reference to FIGS. 3, 4, and 5A-5L. The previously described device of the invention, to which explicit reference will also be made below, can be used to carry out the method according to the invention.

In the initial situation the following data are acquired by computing unit 8: First, the appointments of the appointment calendar of mobile telephone 13, which belongs to the driver of vehicle 1, whereby the current time as well, including day the week and time of year, is determined, in order to be able to derive therefrom first implications for the likely traffic situation and the lighting requirements; second the geographical positions associated with the appointments in the appointment calendar; third the residual amount of charge in battery 2 available for powering vehicle 1; fourth the data on the digital road map and suitable charging stations for charging battery 2; and fifth, for each geographical area where the places associated with the appointments from the appointment calendar are located, the availability data and specific parameters of the charging stations, the traffic situation report, and the weather forecast. These data are updated regularly.

Based on these data, potential travel routes are first analyzed in computing unit 8. The presumably still available residual energy amount resulting from the route selection and energy consumption is calculated from the predicted energy consumption, if the particular route would be taken under the given conditions. In this regard, the time availability and charging output of the possible charging stations are taken into account, particularly the charging stations in the vicinity of the locations associated with the appointments. The most favorable routes for the driver, a route plan and a charging plan are then selected. For example, the times are so optimized that no additional unnecessary idle times for the driver between two appointments minus a time buffer occur, so that in case of a not fully booked appointment schedule the unplanned free time is consolidated in a contiguous time corridor for potential additional appointments. For this purpose, the driver may optionally input his preferences, e.g., how a time buffer between two appointments may be considered.

Based on the thus selected route plan and energy replenishment plan, appointment-associated supplemental time periods result, such as driving times between two appointments and charging times for charging battery 2. These may preferably be selected for battery 2 to be charged during an appointment, as a result of which walking times still arise, e.g., the time for the walk from the charging station to appointment location. Graphical data for the daily appointment schedule are then generated by control unit 7.

Figure 3:
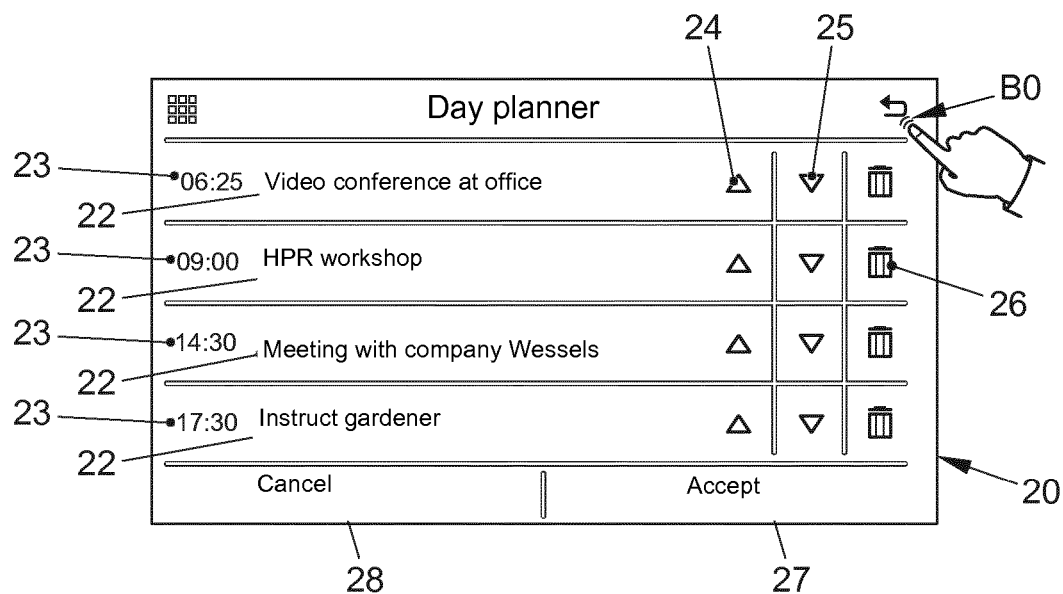
FIGS. 3 and 4 each show an appointment schedule, which according to an exemplary embodiment of the invention can be switched between two operating modes, whereby in one operating mode according to the invention the free time periods are visualized.

Appointment schedule 20 is displayed for the driver in an overview operating mode on touchscreen 10 of navigation device permanently installed in vehicle 1 (FIG. 3). Alternatively, the display surface of mobile phone 13, brought along by the driver, in cradle 12 can also be used for outputting the display contents. In the first operating mode, the appointment sequence of the individual appointments 22 with the specific start times 23 is shown in a graphical list. The appointment sequence can be changed by touching button areas 24, 25, in that the appointment 23 entered in the relevant row can be moved up or down in the sequence. After this type of operating action, the effects on the route plan, the energy replenishment plan, and/or appointment schedule 20 are checked in computing unit 8 and optionally an updated appointment schedule 20 is produced (not shown). Appointment schedule 20 in the first operating mode shows in addition other button areas 26-28, known per se, for deleting individual appointments 22, for canceling an operating action, and for accepting previously input changes.

Figure 4:
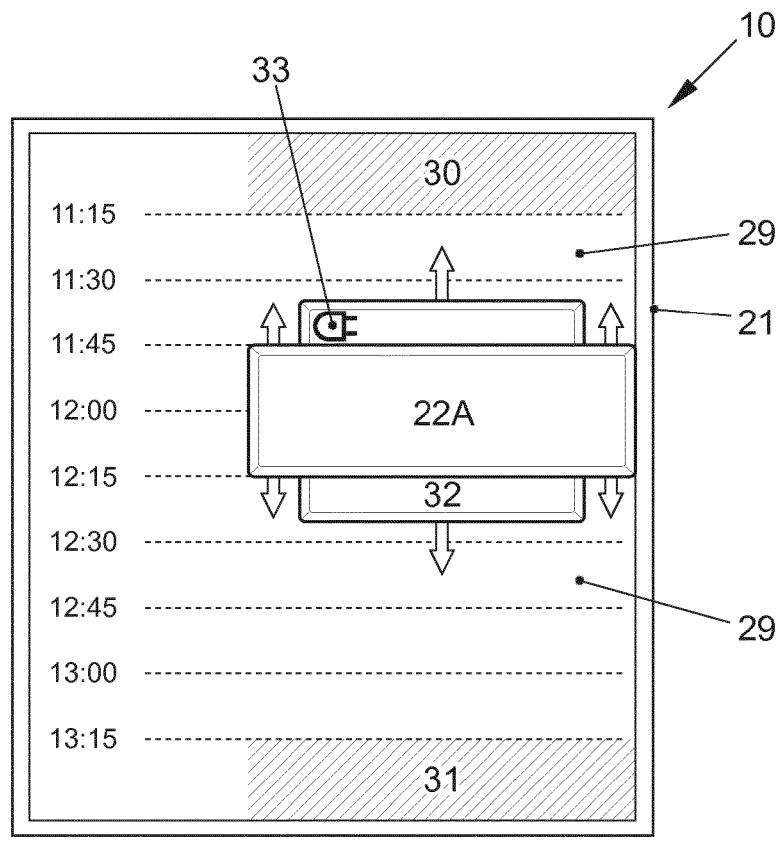

The driver can change the appointment scheduler in a detail operating mode by executing operating action B0, in that he touches touchscreen 10 on the button area at the top right. In this operating mode, appointment schedule 21 is displayed with appointments 22 and supplemental time periods 30, 31, 32 associated therewith (FIG. 4). Free time periods 29 around appointment 22A and supplemental time periods 30, 31, 32 are visualized for the driver as an appointment-schedule degree of freedom, whereby the driver can run through the time list using a scrolling image (not shown) in a manner known per se, in order to display earlier or later appointments 22. The change from the detail operating mode back to the overview operating mode occurs either automatically, e.g., after a time interval in which no further operating action was detected, or again by touching touchscreen 10 at the top right corner (not shown).

The driver in the detail operating mode is provided not only with a very easily understandable visualization of the free time periods 29, but in addition an overview of the relationships of supplementary times 30, 31, 32 with the appointment 22A. In this operating mode, he can change in particular an existing appointment or add a new appointment.

A prior appointment limit 30 and a subsequent appointment limit 31 are shown for appointment 22A. These appointment limits 30, 31 result from the length of the prior or subsequent appointment 22 and from the associated travel times. Charging time 32 and a charging symbol 33 are also displayed. The driver can now manipulate appointment 22A and the time of the charging time period by various operating actions B1-B4, as will be explained in greater detail below with reference to FIGS. 5A-5L. Operating actions B1, B2 are carried out as drag gestures with one or more fingers in the same direction and operating actions B3, B4 as drag gestures with several fingers in the opposite direction on touchscreen 10.

Figure 5A:
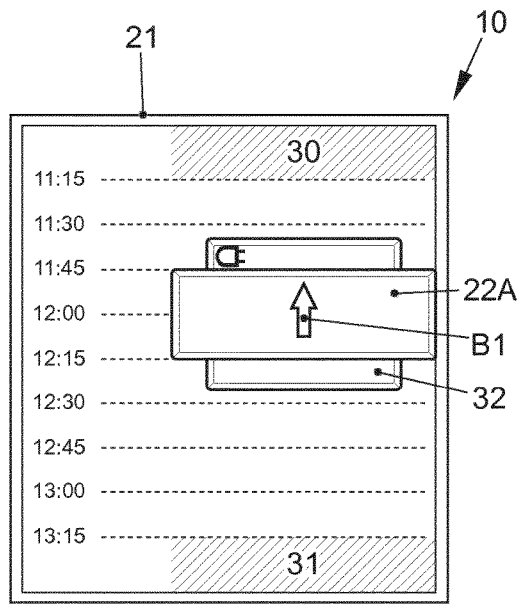
FIGS. 5A-5L show display and operating examples of the appointment scheduler, which were generated and carried out according to an exemplary embodiment of the invention.
Figure 5B:
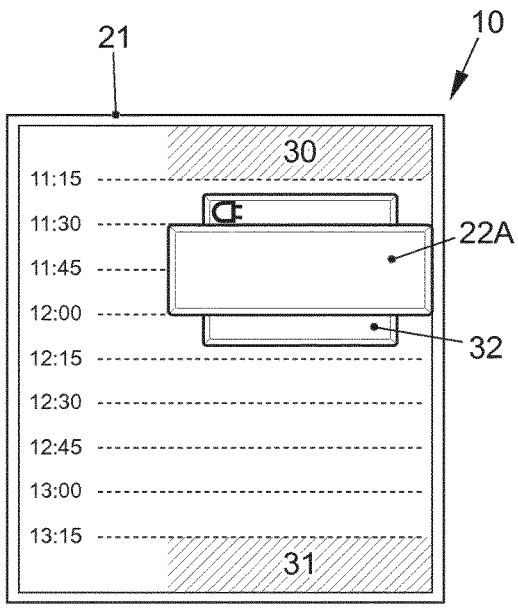

According to FIG. 5A, appointment 22A is moved to an earlier time by the upwardly directed drag gesture B1 on the display area of appointment 22A. Appointment 22A and the charging time 32 coupled thereto can be moved only up to appointment limit 30 (FIG. 5B). Further movement is initially impeded. The route plan associated with appointment schedule 21 and the charging plan are accordingly recalculated and, if necessary, a suitable charging station is reserved via wireless interface 14 or an already made reservation is updated.

Figure 5C:
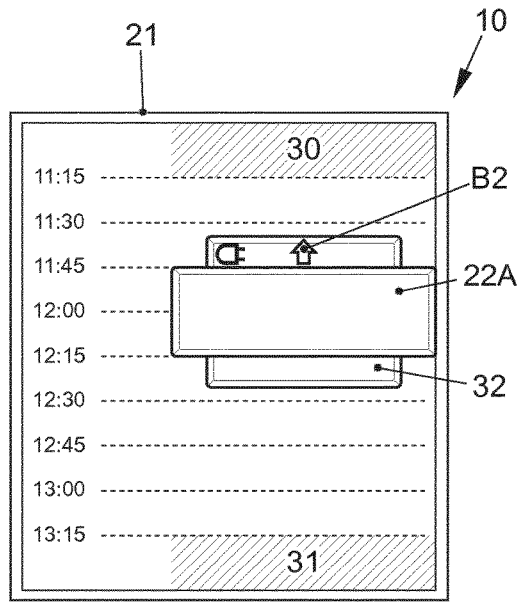
Figure 5D:
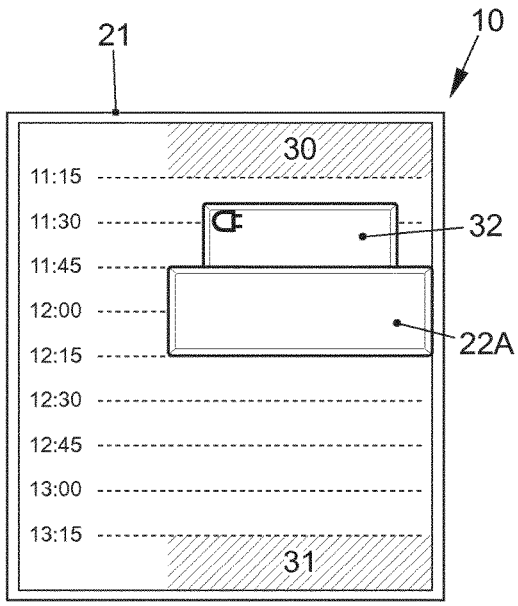

According to FIG. 5C, charging time 32 is moved to an earlier time relative to the fixed appointment 22A by the upwardly directed drag gesture B2 on the display area of charging time 32. Charging time 32 can be moved only so far that the end of the charging process does not fall before the end of appointment 22A (FIG. 5D). The user's intent that the driver would like to drive on with a fully charged battery 2 immediately after the end of appointment 22A is recognized due to operating action B2. Further changes are impeded because this would unnecessarily tie up more time before appointment 22A. The route plan associated with appointment schedule 21 and the charging plan are accordingly recalculated and optionally a suitable charging station is reserved via wireless interface 14 or an already made reservation is updated.

Figures 5E, 5F:
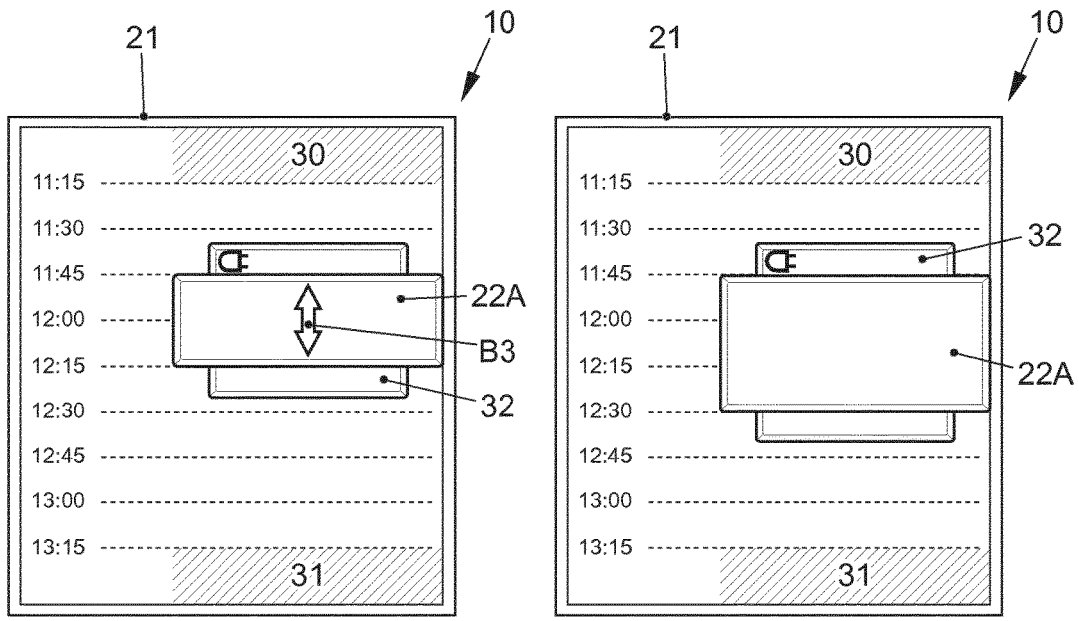

According to FIG. 5E, appointment 22A is extended in time by a spread gesture B3 on the display area of appointment 22A. The charging time 32 coupled thereto remains initially unaffected by this (FIG. 5F). The user's intent that the driver wishes to extend appointment 22A is recognized with operating action B3. The route plan associated with appointment schedule 21 is accordingly recalculated. It is calculated further whether there are effects or optimization options in regard to the charging plan. In case that the driver would like to start with a fully charged battery 2 after appointment 22A, the start of charging may be moved to a later time in the case of an extended appointment 22A; as a result, a free time period 29 arises before appointment 22A or can be extended. Optionally, a suitable charging station can be reserved via wireless interface 14 or an already made reservation can be updated.

Figures 5G, 5H:
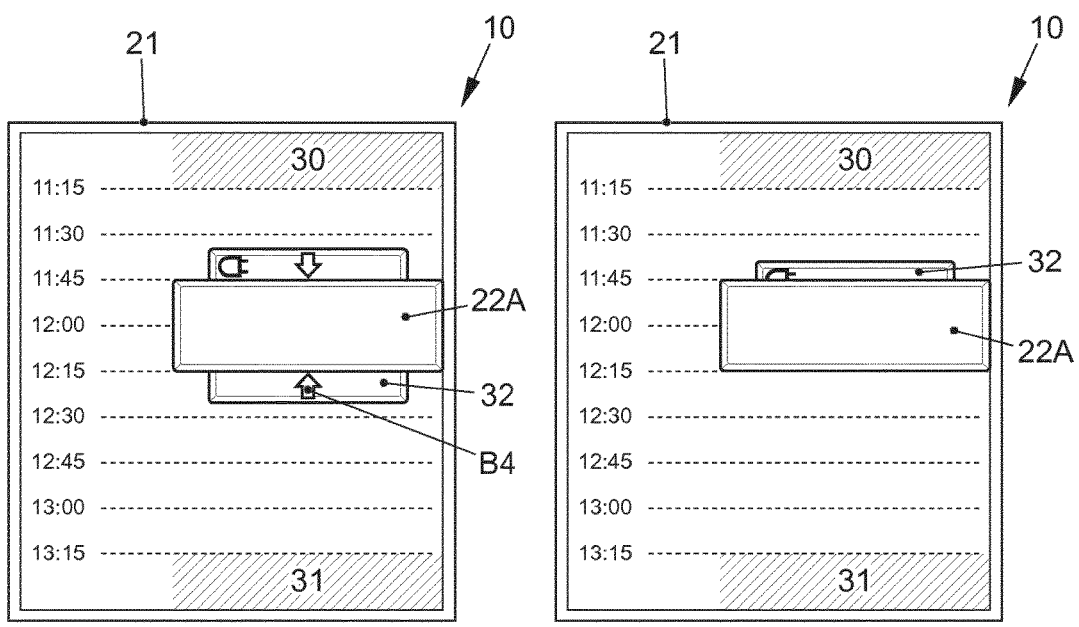
Figure 5I:
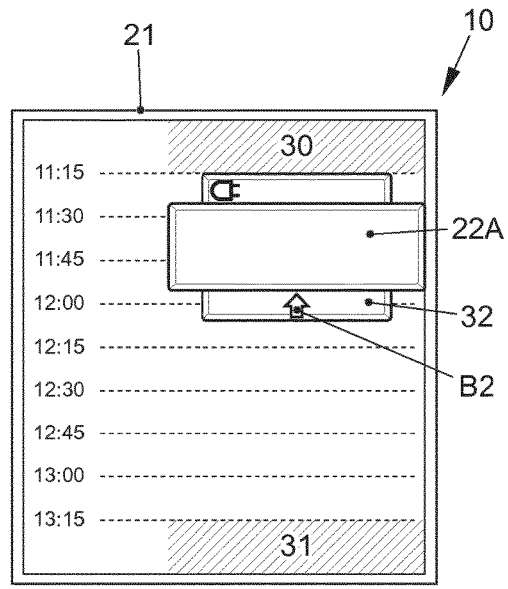

According to FIG. 5G, charging time 32 is shortened by the pinching gesture B4 on the display area of charging time 32. The start of charging time 32 can be moved back only so far that the start of the charging process occurs still early enough before the start of appointment 22A that due to the additional supplemental times such as walking from the charging station to appointment 22A the latter can still be reached on time (FIG. 5H). The user's intent that the driver would like to have battery 2 charged as quickly as possible is recognized through operating action B4. The charging plan associated with appointment schedule 21 is recalculated accordingly and a suitable charging station is reserved via wireless interface 14 or an already made reservation is updated.

Figure 5J:
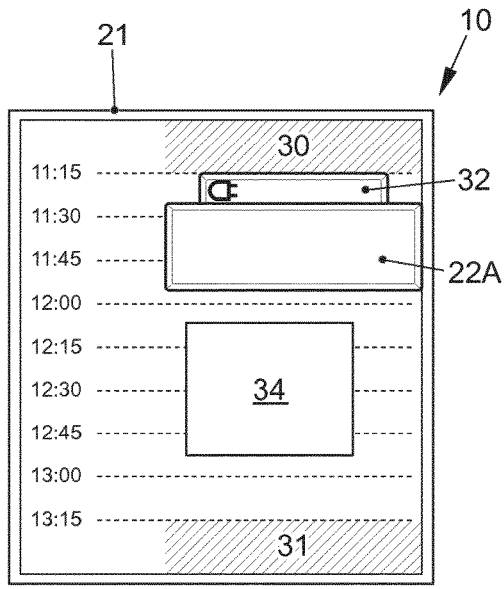

The shortened charging time according to the situation depicted in FIGS. 5G, 5H can create the need that a charging station with a greater charging output must be reserved. In a similar situation in FIG. 5I, the driver would like to move the charging period to an earlier time but is blocked by the previous appointment limit 30. In both cases a message box 34 is then displayed to the driver, as is shown in FIG. 5J. Via said message box 34 the driver is made aware of the time conflict and/or the necessary change and he is shown a list of suggestions as to how the problem can be resolved. The driver now has the choice of reserving a charging station with a greater charging output and possibly the higher charging costs associated therewith, or alternatively to accept a longer charging time period or a less charged battery 2. Another option would be that a fast route between appointment 22A and the previous or subsequent appointment 22 can be calculated by a route recalculation. The effects on other specifications made by the driver, e.g., cost or energy consumption, are to be checked by computing unit 8. Such a result can also be output in a message box 34.

Figure 5K:
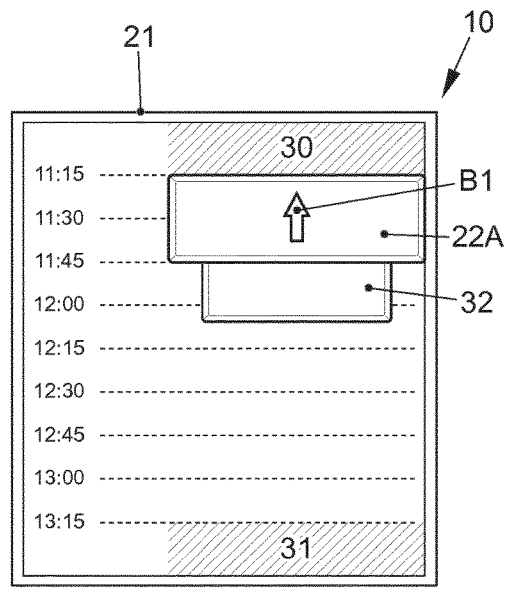
Figure 5L:
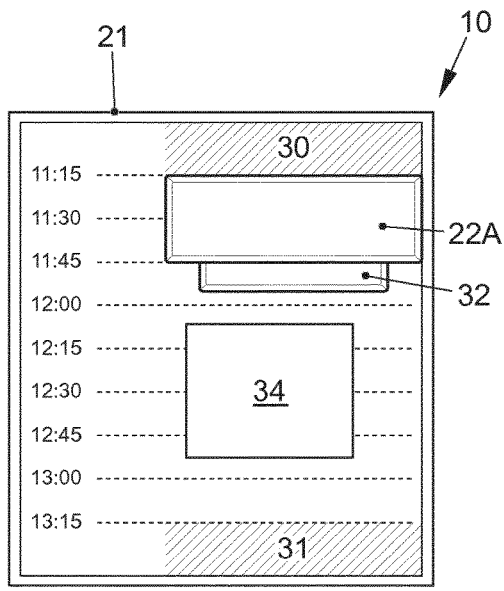

According to FIG. 5K, appointment 22A, similar to the situation in FIG. 5A, is moved to an earlier time by the upwardly directed drag gesture B1 on the display area of appointment 22A. If the driver now tries to move the appointment to a still earlier time, he is first shown message box 34, which makes him aware of the appointment conflict (FIG. 5K). In this case, computing unit 8 analyzes alternative appointment schedules, in which, e.g., a faster route between the location of the prior appointment and the location of appointment 22A and changes of a previously set time buffer are considered. With a new execution of operating action B1, appointment 22A is thereupon advanced by a few minutes and the driver is notified in message box 34 that a faster navigation route with a greater energy consumption was selected, a time buffer was shortened or deleted, and/or the previous appointment is to be optionally moved up or shortened.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for providing an electronic appointment scheduler for a vehicle, the method comprising:
    acquiring, from a mobile user device, appointments with associated time data and geographical positions, the appointments being transferred from the mobile user device to a control unit of an in-vehicle system;
    acquiring a residual energy amount available for powering the vehicle;
    acquiring data on a geographical road network, including geographical positions of energy supply facilities suitable for the vehicle;
    generating, in the control unit, a route plan and an energy replenishment plan with consideration of the time data and geographical positions associated with the appointments and with consideration of an available residual energy amount and an energy consumption by the vehicle on a potential travel route;

calculating appointment-associated supplemental time periods associated with the appointments, which are derived based on the route plan and the energy replenishment plan;

generating and outputting an appointment schedule with the appointments and the appointment-associated supplemental time periods associated with the appointments; and displaying the appointment schedule on a touchscreen display, the touchscreen display configured to operate in a first operating mode in which an appointment sequence of individual appointments in the appointment schedule is shown in a graphical list and a second operating mode in which the individual appointments and appointment-associated supplemental time periods are shown together, and in the second operating mode free time periods are listed in the schedule along with the individual appointments and the appointment-associated supplemental time periods, wherein in the second operating mode the schedule is displayed and a manipulatable icon is displayed over the schedule, the manipulatable icon visually representing the individual appointments and the appointment-associated supplemental time periods, wherein when an appointment sequence is changed, then effects on other parts of the appointment schedule are analyzed, wherein when the time data associated with an appointment is changed, then effects on other parts of the appointment schedule are analyzed, wherein when an appointment-associated supplementary time period is changed, then effects on other parts of the appointment schedule are analyzed, and wherein in the second operating mode, the individual appointments are manipulated by performing a touch gesture to the manipulatable icon, the touch gesture comprising at least one of dragging, spreading or pinching the manipulatable icon; wherein the appointment scheduler is switched at least between two operating modes via an operating action, wherein, in a first operating mode, the appointments and the supplementary time periods caused by the route plan and/or energy replenishment plan are shown and the time data associated with an appointment and/or a supplementary time period are shifted in time by an operating action, and wherein, in a second operating mode, the supplementary time periods are faded out and the appointment sequence is changed by an operating action; and wherein, if in consideration of all limiting conditions based on which the appointment schedule is generated, a time conflict between appointments and supplementary periods is detected, a warning message is output and optionally a list of suggestions for eliminating the time conflict is displayed.

2. The method according to claim 1, wherein the vehicle is be powered electrically and the suitable energy supply facilities comprise electrical charging points.

3. The method according to claim 2, wherein properties of the charging points, particularly their time availability and charging output, are acquired and considered in the generation of the appointment schedule.

4. The method according to claim 1, wherein the supplemental time periods comprise:

travel times between two appointments at a different geographical position;

walking times between a charging station and a geographical position associated with an appointment;

waiting times at an energy supply facility, particularly at a charging station; and/or energy replenishment times, particularly charging times at an energy supply facility.

5. The method according to claim 1, wherein the route plan and/or the energy replenishment plan are generated based on the topography of the geographical road network, traffic, time of day, day of the week, time of year, weather conditions, route-specific energy consumption, cost, availability of the energy supply facility, and/or the residual energy amount.

6. The method according to claim 1, wherein the appointment sequence, the time data associated with an appointment, and/or a supplementary time period resulting from the energy replenishment plan are changed by an operating action, and wherein the route plan, the energy replenishment plan, and/or the appointment schedule are generated anew.

7. The method according to claim 1, further comprising allowing a user to manipulate the appointment schedule through input gestures on an in-vehicle touch screen.

8. The method according to claim 7, further comprising limiting manipulation of a certain appointment in the appointment schedule based on a prior appointment limit and a subsequent appointment limit.

9. The method according to claim 1, wherein, in the first operating mode, each individual appointment in the appointment sequence includes at least one touch button area configured to receive user touch input to move an individual appointment up and/or down in the appointment sequence.

10. The method according to claim 9, wherein, in the first operating mode, each individual appointment in the appointment sequence further includes a delete button configured to receive user touch input to delete an individual appointment from the appointment sequence.

11. The method according to claim 1, wherein, in the second operating mode, the touchscreen display is configured to receive user drag gesture input to manipulate an individual appointment.

12. A device for providing an electronic appointment scheduler for a vehicle, the device comprising:

a first interface to a data memory, in which data on a geographical road network, including geographical positions of energy supply facilities suitable for the vehicle are stored;

a second interface over which appointments with the associated time data and geographical positions are acquired, the second interface connecting a mobile user device to an in-vehicle system such that the appointments are acquired by the in-vehicle system from the mobile user device;

a third interface over which the residual energy amount available for powering the vehicle is acquired;

a computing unit, associated with the in-vehicle system, coupled to the interfaces, via which a route plan and an energy replenishment plan is generated with consideration of the time data and geographical positions of the appointments and with consideration of the available residual energy amount and the energy consumption by the vehicle on a potential travel route, wherein appointment-associated supplemental time periods associated with the appointments arising from the route plan and the energy replenishment plan are calculated;

an output unit coupled to the computing unit, via which an appointment schedule generated by the computing unit with the appointments and the appointment-associated supplemental time periods associated with the appointments is output; and a touchscreen display configured to display the appointment schedule, the touchscreen display configured to operate in a first operating mode in which an appointment sequence of individual appointments in the appointment schedule is shown in a graphical list and a second operating mode in which the individual appointments and appointment-associated supplemental time periods are shown together, and in the second operating mode free time periods are listed in the schedule along with the individual appointments and the appointment-associated supplemental time periods, wherein in the second operating mode the schedule is displayed and a manipulatable icon is displayed over the schedule, the manipulatable icon visually representing the individual appointments and the appointment-associated supplemental time periods, wherein when an appointment sequence is changed, then effects on other parts of the appointment schedule are analyzed, wherein when the time data associated with an appointment is changed, then effects on other parts of the appointment schedule are analyzed, wherein when an appointment-associated supplementary time period is changed, then effects on other parts of the appointment schedule are analyzed, wherein in the second operating mode, the individual appointments are manipulated by performing a touch gesture to the manipulatable icon, and wherein in the second operating mode, the individual appointments are manipulated by performing a touch gesture to the manipulatable icon, the touch gesture comprising at least one of dragging, spreading or pinching the manipulatable icon; wherein the appointment scheduler is switched at least between two operating modes via an operating action, wherein, in a first operating mode, the appointments and the supplementary time periods caused by the route plan and/or energy replenishment plan are shown and the time data associated with an appointment and/or a supplementary time period are shifted in time by an operating action, and wherein, in a second operating mode, the supplementary time periods are faded out and the appointment sequence is changed by an operating action; and wherein, if in consideration of all limiting conditions based on which the appointment schedule is generated, a time conflict between appointments and supplementary periods is detected, a warning message is output and optionally a list of suggestions for eliminating the time conflict is displayed.

13. A method of providing an electronic appointment scheduler for a vehicle, the method comprising:

acquiring appointments with associated time data and geographical positions;

acquiring a residual energy amount available for powering the vehicle;

acquiring data on a geographical road network, including geographical positions of energy supply facilities suitable for the vehicle;

generating a route plan and an energy replenishment plan with consideration of the time data and geographical positions associated with the appointments and with consideration of an available residual energy amount and an energy consumption by the vehicle on a potential travel route;

calculating appointment-associated supplemental time periods associated with the appointments, which are derived based on the route plan and the energy replenishment plan;

generating and outputting an appointment schedule with the appointments and the appointment-associated supplemental time periods associated with the appointments; and displaying the appointment schedule on a touchscreen display, wherein the schedule is displayed and a manipulatable icon is displayed over the schedule, the manipulatable icon visually representing the individual appointments and the appointment-associated supplemental time periods, wherein when the appointment sequence, the associated time data and/or the supplemental time periods are changed by an operating action then the route plan, the energy replenishment plan and/or the appointment schedule is updated, and wherein the individual appointments are manipulated by performing a touch gesture to the manipulatable icon, the touch gesture comprising at least one of dragging, spreading or pinching the manipulatable icon; wherein the appointment scheduler is switched at least between two operating modes via an operating action, wherein, in a first operating mode, the appointments and the supplementary time periods caused by the route plan and/or energy replenishment plan are shown and the time data associated with an appointment and/or a supplementary time period are shifted in time by an operating action, and wherein, in a second operating mode, the supplementary time periods are faded out and the appointment sequence is changed by an operating action; and wherein, if in consideration of all limiting conditions based on which the appointment schedule is generated, a time conflict between appointments and supplementary periods is detected, a warning message is output and optionally a list of suggestions for eliminating the time conflict is displayed.

* * * * *